H. T. HERR.
CLUTCH.
APPLICATION FILED JUNE 6, 1913.
1,245,718.
Patented Nov. 6, 1917.
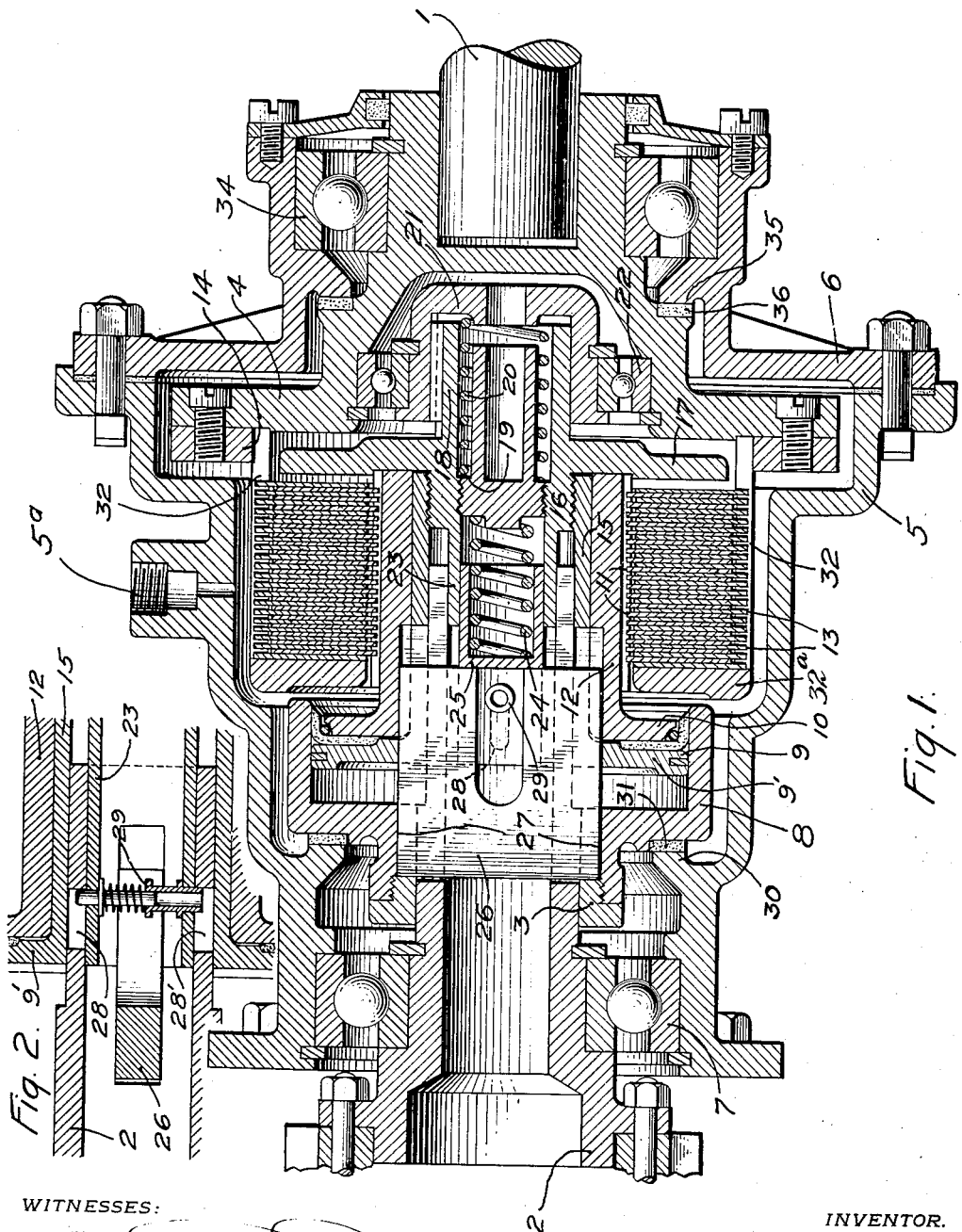
WITNESSES:
INVENTOR.
Herbert T. Herr
BY
HIS ATTORNEY IN FACT.

UNITED STATES PATENT OFFICE.

HERBERT T. HERR, OF PITTSBURGH, PENNSYLVANIA.

CLUTCH.

1,245,718.  Specification of Letters Patent.  Patented Nov. 6, 1917.

Application filed June 6, 1913. Serial No. 772,108.

*To all whom it may concern:*

Be it known that I, HERBERT T. HERR, a citizen of the United States, and a resident of Pittsburgh, in the county of Allegheny and State of Pennsylvania, have made a new and useful Invention in Clutches, of which the following is a specification.

This invention relates to a fluid actuated friction clutch and has for its primary object to provide means for preventing end thrusts when the clutch is applied.

Another object of the invention is to provide means whereby the driving shaft and the driven shaft may be effectively connected together by fluid pressure actuating means.

Other objects and advantages, as well as the numerous details of construction of the invention will appear hereinafter, it being understood that changes in form, proportion, and minor details of construction may be resorted to without departing from the spirit of the invention or sacrificing any of its advantages.

In the drawings:

Figure 1 is a vertical longitudinal sectional view through a clutch mechanism constructed in accordance with my invention;

Fig. 2 is a fragmentary sectional view through a piston, sleeve, and wedge, forming part of the clutch illustrated, and a telescopic bolt for limiting the relative movement between the parts.

The clutch herein illustrated is shown as comprising a driving member and a driven member, together with two sets of interleaving friction disks so arranged that when pressure is applied one set of disks will bind on those of the other so as to lock the driving member and the driven member together. A plurality of packing rings are also shown to prevent the escape of air or other actuating fluid which may be applied to the clutch. The clutch-holding members may be balanced so as to prevent end thrust if desired, or either member may be caused to preponderate over the other and cause pressure to be applied to the packing ring to prevent the escape of the actuating fluid.

Referring to the drawings by numerals of reference:

1 designates the driving shaft, as for example, the shaft of a motor, and 2 designates the driven shaft. Interposed between these two shafts is a clutch including two complementary members 3 and 4 the members 3 and 4 being contained within a clutch casing which consists of the parts 5 and 6, and having a fluid inlet 5ª. The driven shaft 2 is illustrated as hollow and is mounted in bearing 7 and carries the member 3 and a piston cylinder 8 forming a part of the member 3. The piston cylinder is adapted to move longitudinally of the shaft 2, but as shown it will rotate with it within the clutch casing. Within the cylinder 8 is a piston 9 made up of the parts 9' and 10, this construction being employed for convenience in inserting a suitable leather packing ring or any other packing between the two parts 9' and 10. The part 10 is sleeved on the cylindrical portion 15 of the piston and carries a plurality of disks 11 which surround the sleeved portion 12 of the part 10 and which interleave with disks 13 secured to the diskcarrying member 14 of the part 4. The sleeved portion 15 of the member 9' is threaded to the hub 16 of disk 17, said disk having a central reverse tubular portion 18 within which is a spring seat 19. One end of a spring 20 bears against the spring seat 19 and the other end of said spring bears against a cup bearing 21 which in turn is mounted in bearing 22 secured to the diskcarrying member 14. The hub 16 carries an annular flange 23 between which and the sleeved portion 15 is received a slotted projection on the end of the shaft 2, which in actual practice may be a continuation of the driven shaft 2. Within the space surrounded by the flange 23 is a spring 24 one end of which bears against the spring seat 19 and the other end of which bears against a plunger 25 slidable within the flange 23 and adapted to bear against the flat key 26 which extends through slots in the two sleeved portions 12 and 15 of the piston 9 and through the slotted portions of the shaft 2, as well as into recesses 27 in the cylinder 8, this key being so arranged that the cylinder 8, the piston 9, and the driven shaft 2 must all rotate together, although the piston and its cylinder may have longitudinal movement independent of each other and independent of the remaining elements. The shaft 2 is provided with elongated slots 28 and 28' adjacent to the end of flange 23, and by reference to Fig. 2, it will be observed that an extensible bolt 29 projects through openings in the flange 23 and has its free ends extending into the slots 28 and 28' so that longitudinal movement of the piston with respect to the shaft 2 will be limited by the length of slots 28 and 28'.

By reference to Fig. 1, it will be observed that the tension of the spring 24 preponderates over that of the spring 20 and that the plunger 25 will be forced against the key 26 so as to normally keep the cylinder 8 packed against the shoulder 30 of the member 5 of the casing, there being a packing pad 31 therebetween for this purpose. The disk-carrying member 4 is provided with laterally projecting fingers 32 which carry disks 13 interleaving with disks 11, and a compression plate 32ª, which is rigidly secured to them. The member 14 is shown as being mounted in a sliding bearing 34 so that when pressure is supplied to the inside of the casing, there may be a slight longitudinal movement of the member 14 so as to insure packing of the member against the shoulder 35, between which and the member 14 is interposed a packing pad 36 to prevent the escape of air or oil, or both. The member 4 will normally be held sufficiently tight for all practical purposes against the shoulder 35 by the spring 20. If the parts are properly assembled and pressure is admitted into the casing, it being understood that there is a fluid pressure chamber within the casing surrounding the clutching parts of the mechanism, the pressure will exert force in a direction from right to left against the cylinder 8 and pack the cylinder against the inside of the casing at 30; likewise pressure exerted against the member 4 from left to right will be effective in packing the member 4 against the interior of the casing at 35 so the interior of the casing between the points 30 and 35 will be sealed except for the inlet 5ª. Just as soon as the pressure begins to accumulate, the pressure exerted on the piston 9 consisting of the members 9' and 10 will force the piston into its cylinder 8 from right to left and cause the interleaving disks to bind together by frictional contact so as to lock the driving shaft and the driven shaft together. As soon as pressure is relieved, the spring 24 will move the piston in a direction in opposition to that imparted to it by the pressure; that is, from left to right, and move the disks out of clutching engagement so that the shaft 1 may rotate independently of the shaft 2. As the exposed parts of one member; that is, the parts exposed to pressure, are equal in area to the parts exposed to pressure by the other member, the clutch will be balanced and not subjected to end thrusts as is usually the case with clutches now generally employed. While the clutch is here shown as being balanced, it is obvious that the parts may be so designed that there may be a preponderance of pressure in either direction so as to insure the packed parts being perfectly tight during the operation thereof.

The operation of the apparatus is as follows: When fluid pressure is admitted to the interior of the casing through the port 5ª the piston 9 is moved into its cylinder 8 by reason of the fact that it is exposed on one side only to the pressure within the casing and on the other side to the atmosphere, the interior of the cylinder being exposed to atmospheric pressure through the clearance spaces around the key 26. The member 4 is moved in the opposite direction by the pressure delivered to the casing and in this way the interleaving disks, 11 and 13, are moved into clutching engagement with each other. During this relative movement of the clutch members the spring 24, located between the cylinder 8 and the piston 9, is compressed and the cylinder 8 is forced into packing engagement with the casing 5 by the pressure of spring 24. As the member 4 moves in response to the fluid pressure within the casing it presses the packing 36 against the casing and consequently both ends of the casing are sealed. By proportioning the exposed area of the member 4 so that it is substantially equal to the exposed area of the piston 9, the fluid pressure within the casing acting on one clutch member is counterbalanced by the effective pressure on the other member and consequently the clutch mechanism does not impart an end thrust to either the driving or driven shaft. In the drawing the area of the member 4, exposed to unbalanced fluid pressure, is substantially equal to the area of the piston 9 and consequently the lateral thrust of one clutch member is counter-balanced by the lateral thrust on the other member. When the pressure is released from the casing the spring 24 moves the clutch members out of clutching engagement. Under such conditions the spring 20, which as has been said is of less strength than the spring 24, is partially compressed, and it acts to move both the clutch members into packing engagement with the ends of the casing 5.

Having thus described my invention, what I claim is:

1. A clutch mechanism comprising a casing having a pressure delivery port communicating with an inclosed pressure chamber, coöperating clutch members located within said chamber and movable into clutching engagement in response to pressure introduced into the chamber, a driving shaft projecting into the casing and operatively secured to one of said members, a driven shaft projecting into the casing and operatively secured to the other member, and a packing between each member and the casing, for sealing the ends of the casing.

2. A clutch comprising a casing having an opening at each end, a driving shaft projecting into the casing at one end, a driven shaft projecting into the other end of the casing, a fluid chamber formed within the casing, and receiving fluid through a port formed within the casing, relatively movable clutch elements located within the casing and responsive in operation to fluid pressure within the chamber, said clutch elements having means for sealing the ends of the chamber.

3. A clutch mechanism comprising a stationary casing having a pressure inlet port communicating with an inclosed pressure chamber, two relatively movable clutch members located within said casing and movable into clutching engagement in response to pressure within the chamber, a separate shaft projecting into the casing and operatively connected to each member, and a packing between each member and the casing for sealing the opening in the casing through which the coöperating shaft projects.

4. A clutch comprising a casing inclosing a fluid pressure chamber and provided with a fluid inlet communicating with said chamber, two clutch members in the fluid pressure chamber, one of which comprises a cylinder and piston and the other of which comprises a disk-carrying member, and interleaving disks, on the respective clutch members, those on one member being adapted to bind against those on the other.

5. A clutch comprising a casing having a fluid pressure chamber with openings at its respective ends, two clutch members adapted to movements in opposite directions to close the respective ends of said chamber, and means on one of the clutch members for engaging the other member.

6. A clutch comprising a casing having a fluid chamber, two clutch members one of which comprises a cylinder and piston within the chamber, means for permitting longitudinal movement of the piston with relation to the cylinder, but preventing rotative movement with respect to these two, and means on the respective clutch members for locking said members together.

7. A clutch mechanism comprising a casing having a pressure delivery port communicating with an inclosed pressure chamber, coöperating clutch members located within the chamber, one of which comprises a piston and a cylinder, and springs for moving said members out of operative engagement with each other and for pressing the cylinder forming a part of one member into packing engagement with the casing.

8. A clutch mechanism comprising a stationary casing having a pressure inlet port communicating with an inclosed pressure chamber, two relatively movable clutch members located within said pressure chamber and movable into clutching engagement with each other in response to pressure within said chamber, one of said members being formed in two parts, a separate shaft projecting into the casing and operatively connected to each member, a packing between one of the parts of said two-part member and the casing, and a spring for forcing one part of said two-part member against said packing and thereby sealing the opening between the coöperating shaft and the casing.

9. A clutch mechanism comprising a stationary casing having a pressure delivery port communicating with an inclosed pressure chamber, and two clutch members located within said chamber and responsive in operation to pressure delivered to said chamber, the unbalanced areas exposed to pressure within said chamber of each of said members being substantially equal whereby the actuating pressure on one member is counterbalanced by the pressure on the other.

10. A clutch mechanism comprising a casing having an inlet port communicating with the interior of the casing and an opening at each end, two clutch members located within the casing, and so arranged that fluid pressure admitted thereto moves said members into clutching engagement, a spring for yieldingly holding said members out of clutching engagement, and packings carried by said members for sealing the ends of the casing.

11. A clutch mechanism comprising a casing having an inlet port communicating with the interior of the casing, a driving element projecting into said casing, a driven element projecting into the casing, relatively movable clutch members, one being mounted on said driving element and one on said driven element, said members having surfaces exposed to unbalanced fluid pressure within said casing for moving them into clutching engagement in response to fluid pressure admitted through said port, a spring for yieldingly holding said members out of clutching engagement and packings carried by said members for sealing the joints between said casing and said elements.

12. A clutch mechanism comprising a casing having a fluid inlet port, two relatively movable clutch members located within the casing and responsive in operation to fluid pressure admitted to said casing through said port, a driving element projecting into said casing on which one of said members is mounted, a driven element projecting into said casing on which the other clutch member is mounted, packings carried by said members for sealing the joints between the casing and said elements, a spring between said members for normally holding the members out of clutching engagement, and a second spring between said members for pressing said elements into packing engagement with the casing.

13. A clutch mechanism comprising a casing having a fluid inlet port, two relatively movable clutch members located within said casing and adapted to be moved into clutching engagement by fluid pressure admitted through said port, one of said members being formed in two relatively movable parts, a packing for sealing one end of the casing mounted on one of the parts of said two part member, a packing carried by the other member for sealing the other end of the casing, and springs for holding said members out of clutching engagement and for pressing said members into packing engagement with the casing, one of said springs being located between the parts of said two part member.

14. A clutch mechanism comprising a casing having a fluid inlet port communicating with the interior thereof, a driving element projecting into one end of the casing, a driven element projecting into the other end of the casing, a separate clutch member mounted on each element and responsive to fluid pressure admitted to said casing through said port for operatively connecting said elements together, the unbalanced areas exposed to fluid pressure within the casing on one of said members being substantially equal to the unbalanced areas of the other member whereby the actuating fluid pressure on one member is counterbalanced by the actuating fluid pressure on the other.

15. A clutch mechanism comprising a casing having a fluid inlet port and an opening at each end, a driving shaft projecting into the casing at one end, a driven shaft projecting into the casing at the other end, a clutch member mounted on the driving shaft, a two part clutch member mounted on the driven shaft, said member including a cylinder and a piston inclosed thereby for operating clutch elements adapted to frictionally engage similar elements on the driven shaft, and responsive to the pressure of fluid admitted at the inlet port and filling the interior of the casing, said fluid being excluded from the interior of the cylinder by the piston.

In testimony whereof, I have hereunto subscribed my name this 2nd day of June, 1913.

HERBERT T. HERR.

Witnesses:
C. W. McGHEE,
ANNA CLOHERTY.